United States Patent
Kato et al.

(10) Patent No.: US 11,330,030 B2
(45) Date of Patent: May 10, 2022

(54) NETWORK RESOURCE ORIENTED DATA COMMUNICATION

(71) Applicant: DreamWorks Animation LLC, Glendale, CA (US)

(72) Inventors: Toshiaki Kato, Irvine, CA (US); Robert Wilson, Burbank, CA (US); Andrew Pearce, Los Angeles, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 16/815,994

(22) Filed: Mar. 11, 2020

(65) Prior Publication Data

US 2021/0029183 A1 Jan. 28, 2021

Related U.S. Application Data

(60) Provisional application No. 62/878,685, filed on Jul. 25, 2019.

(51) Int. Cl.
| | |
|---|---|
| *G06F 13/00* | (2006.01) |
| *G06F 15/173* | (2006.01) |
| *H04L 65/60* | (2022.01) |
| *G06K 9/62* | (2022.01) |
| *G06K 9/46* | (2006.01) |
| *H04Q 11/04* | (2006.01) |

(52) U.S. Cl.
CPC ........... *H04L 65/60* (2013.01); *G06K 9/4604* (2013.01); *G06K 9/629* (2013.01)

(58) Field of Classification Search
USPC .................................................. 709/203, 231
See application file for complete search history.

(56) References Cited

U.S. PATENT DOCUMENTS

| | | | |
|---|---|---|---|
| 6,917,616 B1 * | 7/2005 | Normand ........... | H04Q 11/0478 370/395.1 |
| 7,062,562 B1 * | 6/2006 | Baker ............... | H04L 29/12066 709/203 |
| 7,080,138 B1 * | 7/2006 | Baker ............... | H04L 29/12066 370/232 |
| 7,284,065 B2 * | 10/2007 | Agarwal ................. | H04L 29/06 709/219 |
| 9,483,853 B2 * | 11/2016 | Coon .................... | G06T 3/0068 |
| 10,062,181 B1 | 8/2018 | Longhurst et al. | |

(Continued)

OTHER PUBLICATIONS

European Patent Office Application Serial No. 20187775.0, Search Report dated Dec. 9, 2020, 11 pages.

(Continued)

*Primary Examiner* — Jude Jean Gilles
(74) *Attorney, Agent, or Firm* — Lee, Hong, Degerman, Kang & Waimey PC

(57) ABSTRACT

A method of transmitting rendering data of a computer image to a client terminal via a communication channel includes: receiving rendering results of the computer image from at least one computer of a plurality of computers; identifying a partial region of the computer image based on transmission information; processing a subset of the rendering results, the subset corresponding to the identified partial region of the computer image; and transmitting, at a particular time, the processed subset of the rendering results to the client terminal via the communication channel.

20 Claims, 6 Drawing Sheets

(56) References Cited

U.S. PATENT DOCUMENTS

| | | | |
|---|---|---|---|
| 2002/0031168 A1* | 3/2002 | Kim | H04L 1/0071 375/130 |
| 2002/0116566 A1* | 8/2002 | Saida | G06F 13/4295 710/313 |
| 2005/0128054 A1* | 6/2005 | Glickman | H04N 19/507 340/7.2 |
| 2008/0008378 A1* | 1/2008 | Andel | G06K 9/6292 382/141 |
| 2008/0043742 A1* | 2/2008 | Pong | H04L 49/70 370/394 |
| 2010/0005369 A1* | 1/2010 | Farkas | H04L 1/0045 714/774 |
| 2010/0077342 A1* | 3/2010 | Perl | G06F 9/451 715/784 |
| 2011/0074826 A1* | 3/2011 | Otani | G09G 5/346 345/660 |
| 2011/0258339 A1 | 10/2011 | Matsui et al. | |
| 2012/0093214 A1* | 4/2012 | Urbach | G06F 40/143 375/240.01 |
| 2013/0208785 A1* | 8/2013 | Abdo | G06T 15/005 375/240.02 |
| 2014/0075287 A1* | 3/2014 | Scoda | G06F 40/14 715/234 |
| 2016/0173890 A1* | 6/2016 | Hattori | H04N 19/43 375/240.25 |
| 2016/0381013 A1* | 12/2016 | Buscemi | H04L 63/10 726/4 |
| 2018/0300854 A1* | 10/2018 | Dmitrenko | G06T 15/04 |

OTHER PUBLICATIONS

Bertram, "Production Rendering Acceleration Techniques" International Conference on Computer Graphics and Interactive Techniques, ACM Siggraph 2006 Papers, Jul. 2006, pp. 9-es.

* cited by examiner

NETWORK RESOURCE ORIENTED DATA COMMUNICATION

CROSS-REFERENCE TO RELATED APPLICATION(S)

Pursuant to 35 U.S.C. § 119(e), this application claims the benefit of U.S. Provisional Patent Application No. 62/878,685, filed Jul. 25, 2019, the contents of which are hereby incorporated by reference herein in its entirety.

BACKGROUND

A computer-generated animation is typically created by rendering a sequence of images, with each image depicting a computer-generated scene composed of one or more computer-generated assets (e.g., a character, a group of characters, an environment, an effect, or a lighting rig). During an interactive session for rendering a scene, an artist may use one or more tools to change aspects or conditions of the scene. For example, a lighting artist may use a lighting tool to change conditions of the scene. According to the changes initiated by the artist, each of one or more rendering engines may render an image depicting the scene and send intermediate snapshots of the rendering results to a front-end client. These intermediate snapshots may be sent at particular time intervals. The front-end client controls a display of the snapshots, e.g., at a monitor. The artist may then evaluate progressive results of the changes that he or she had initiated, as the scene is rendered.

Rendering a computer graphics image at high resolution and complexity may be computationally expensive. For example, an artist may view such images at a front-end client (e.g., computer workstation). If computational work for rendering the images is performed only at the computer workstation being used by the artist, the speed of rendering is limited by the computational power of that workstation. To improve computational speed relating to rendering images, one or more back-end rendering engines (e.g., back-end farm computers) may be employed in the rendering process. In this situation, results of rendering an image are sent to the front-end client, e.g., over a communication interface. This may accelerate the presentation of rendered images at the front-end client, so that the artist is able to view, more quickly, results of changes he or she had initiated.

SUMMARY

With respect to various embodiments disclosed herein, features are described for improving performance with respect to communication bandwidth limitations (or preferences) associated with a front-end client. Alternatively (or in addition), features are described for improving performance with respect to buffering capabilities associated with a front-end client.

Aspects of the present disclosure are directed to a system for multi-machine rendering. According to various embodiments, a more safe and stable transmission of data can be facilitated. For example, one or more data transmissions are controlled to adhere more closely to a target bandwidth (e.g., a user-defined bandwidth), while still attempting to maximize (or at least increase) network resource efficiency. According to various embodiments, a shorter latency can be achieved for interactive lighting sessions, thereby providing a better near-real-time experience for an artist at the front-end client.

Although features of embodiments of the present invention may be described, for purposes of illustration, within the context of an interactive lighting session in a computer animation environment, it is understood that described features are by no means limited to this context and may be applied in other contexts within the computer arts.

According to at least one embodiment, a method of transmitting rendering data of a computer image to a client terminal via a communication channel includes: receiving rendering results of the computer image from at least one computer of a plurality of computers; identifying a partial region of the computer image based on transmission information; processing a subset of the rendering results, the subset corresponding to the identified partial region of the computer image; and transmitting, at a particular time, the processed subset of the rendering results to the client terminal via the communication channel.

According to at least one embodiment, a machine-readable non-transitory medium stores thereon machine-executable instructions for transmitting rendering data of a computer image to a client terminal via a communication channel. The instructions include: receiving rendering results of the computer image from at least one computer of a plurality of computers; identifying a partial region of the computer image based on transmission information; processing a subset of the rendering results, the subset corresponding to the identified partial region of the computer image; and transmitting, at a particular time, the processed subset of the rendering results to the client terminal via the communication channel.

According to at least one embodiment, a system for transmitting rendering data of a computer image to a client terminal via a communication channel is disclosed. The system includes one or more controllers configured to: receive rendering results of the computer image from at least one computer of a plurality of computers; identify a partial region of the computer image based on transmission information; process a subset of the rendering results, the subset corresponding to the identified partial region of the computer image; and provide, at a particular time, the processed subset of the rendering results for transmission to the client terminal via the communication channel.

BRIEF DESCRIPTION OF THE DRAWINGS

The above and other aspects and features of the present disclosure will become more apparent upon consideration of the following description of embodiments, taken in conjunction with the accompanying figures.

DETAILED DESCRIPTION

In the following detailed description, reference is made to the accompanying figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Figure 1:
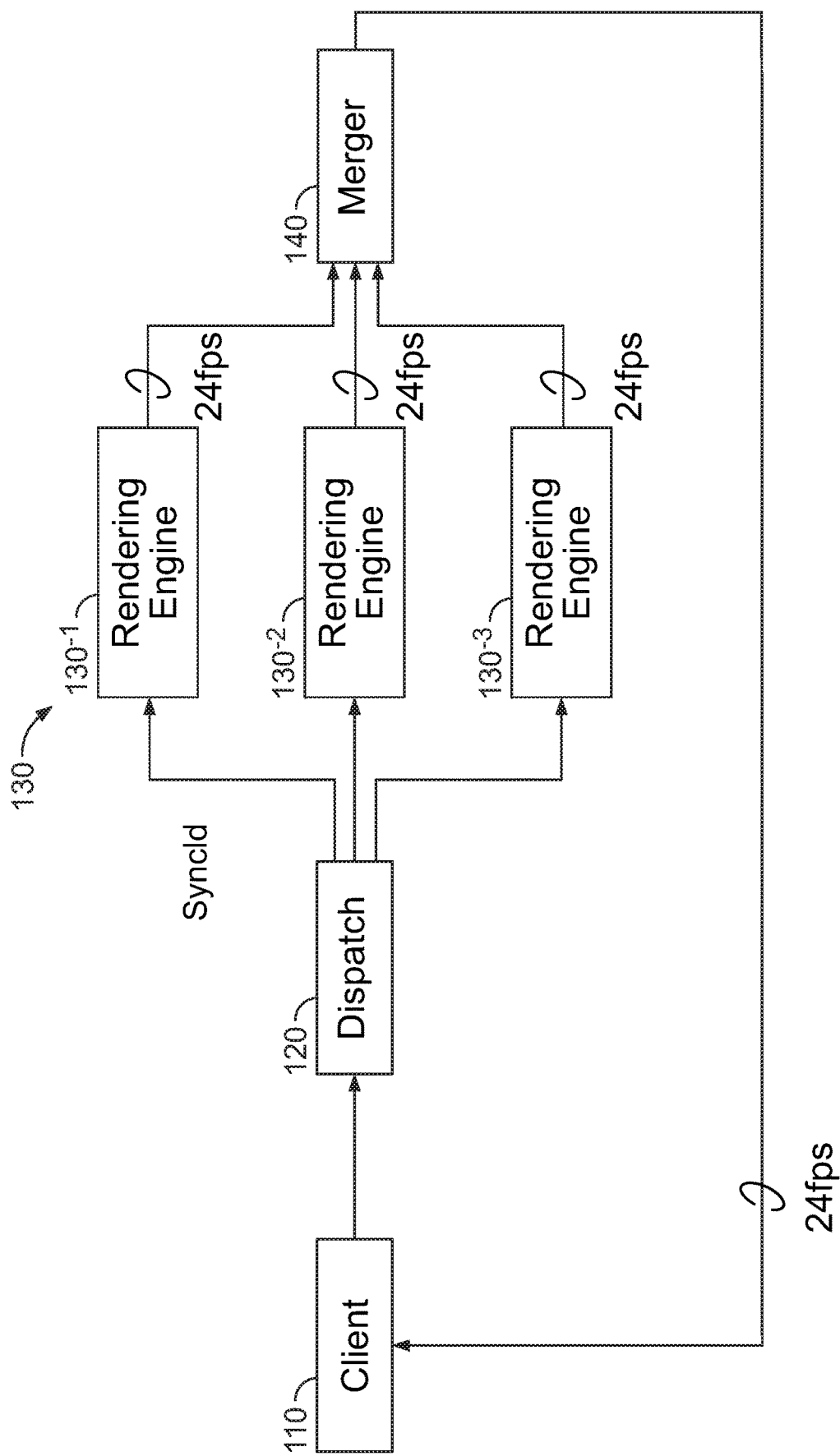
FIG. 1 is a block diagram illustrating operation by a plurality of rendering processes according to least one embodiment.

With reference to FIG. 1, during an interactive rendering session, a client (e.g., front-end client 110) provides inputs (e.g., input scene description, or scene update information) to a dispatch 120. The inputs may include, e.g., changes initiated by an artist. For example, the changes may be provided during the session, which may be an interactive lighting session. One or more changes initiated at or around a particular time may correspond to a unique value of an identifier (e.g., syncId).

For a particular syncId, the dispatch 120 provides the inputs to each of a plurality of rendering engines 130. The rendering engines 130 may begin rendering when a scene is updated by the artist, and the underlying changes are provided to the rendering engines via the dispatch 120. Theoretically, different rendering engines 130 would provide the rendering results of the exact same scene based on data corresponding to a same syncId.

The rendering engines 130 may reside on one or more hosts that are separate from the front-end client 110. For example, the rendering engines 130 may all reside on different hosts (e.g., different remote computers). The inputs are collectively processed by the rendering engines 130. According to at least one embodiment, the rendering engines 130 are independent entities that may be employed to collectively render a single (or same) image.

Each of the rendering engines 130 generates results. For example, different rendering engines 130 may provide results for different pixels. As another example, according to at least one embodiment, different rendering engines 130 may, at or around a particular time, provide results for a same pixel. At a given time, results generated by the rendering engines 130 are processed (or merged, e.g., by a merger 140) to produce a processed (e.g., merged) result. For example, at a particular interval (e.g., an artist-selected interval, such as 24 times per second), each rendering engine 130 provides its results to the merger 140. As illustrated in FIG. 1, each rendering engine 130 may provide results at a frequency of 24 times per second. However, it is understood that this frequency may vary.

The merger 140 combines the results from the rendering engines 130 into a single image for display. The merged result is provided to the front-end client 110 (or saved in storage for later viewing). As illustrated in FIG. 1, the merger 140 provides the merged result at a frequency of 24 times per second. However, it is understood that this frequency may vary. The front-end client 110 may control a display, e.g., an external monitor, to display snapshots of the merged result. As such, the artist may evaluate progressive results of the changes that he or she had initiated. From the perspective of the artist, progressive results may appear to be displayed in near real-time.

If sufficiently large amounts of data (e.g., large data packets) are generated by the merger 140 and sent to the front-end client 110, the performance of the front-end client (or receiver) may suffer. For example, as the amount of data that is sent increases, the process of delivering rendered images may slow, and may cause the front-end client 110 and/or the merger 140 to freeze, or even crash.

As another example, as the number of rendering engines (e.g., rendering engines 130) increases, the volume of data that is sent from the merger 140 to the front-end client 110 may also increase. Ultimately, the merger 140 may not be able to communicate with the front-end client 110 without exceeding bandwidth limitations or related preferences associated with a communication channel located between the merger 140 and the front-end client 110, and/or without exceeding buffering capabilities associated with the front-end client 110.

Aspects of the present disclosure are directed to adjusting (e.g., dynamically adjusting) a quantity or size of data that is sent from a merge process (e.g., merger 140) to a client (e.g., front-end client 110). For example, the quantity of data that is sent at one or more particular times may be controlled. According to particular aspects of the present disclosure, data generation logic is controlled to facilitate safer and/or more robust transfer of data sent by multiple rendering engine processes and the merge process—e.g., during the course of an interactive lighting session.

One or more aspects of the present disclosure are directed to reducing latency. For example, if a merge process receives, from a rendering engine, a rendering result that is associated with a new (or recent) syncId, then this result is sent from the merge process to the client. In an aspect, this result may be sent without waiting for any of the other rendering engines to send a rendering result (e.g., data packet) associated with the new syncId. As such, an artist-initiated change to the scene results in a return of rendering results (e.g., pixels) from the merger 140 as soon as a particular rendering engine returns such results. This decreases the latency experienced (or sensed) by the artist between the time that a change is initiated and the time that rendering results are made available for viewing.

For example, a particular scenario will now be described with reference to FIG. 1. At a particular time, data of a scene corresponding to a particular syncId (e.g., a syncId having a value of 100) is provided to rendering engine 130-1, rendering engine 130-2 and rendering engine 130-3. Subsequently, data of a scene corresponding to a different syncId (e.g., a syncId having a value of 101) is provided to rendering engine 130-1, rendering engine 130-2 and rendering engine 130-3. Afterwards, only a particular rendering engine (e.g., rendering engine 130-1) provides results for data corresponding to the syncId of 101. At this time, no other rendering engine (e.g., neither rendering engine 130-2 nor rendering engine 130-3) has provided results for data corresponding to the syncId of 101. Rather, the most recent results from rendering engine 130-2 and rendering engine 130-3 are for data corresponding to the syncId of 100.

In this scenario, according to at least one embodiment, the merge process (e.g., merger 140) sends, to the client (e.g., front-end client 110), the results received from rendering engine 130-1. These results are sent to the client without waiting for another rendering engine (e.g., rendering engine 130-2 and/or rendering engine 130-3) to provide results for data corresponding to the syncId of 101. Accordingly, latency is reduced, in that results are provided to the artist earlier in time.

According to at least another aspect, all results that are received from the rendering engines (e.g., rendering engines 130) are independently managed inside the merge process (e.g., merger 140). For example, each received data packet is updated independently and in parallel. Regarding results corresponding to a particular syncId, results that are independently received from the rendering engines are merged into a single image at a user defined interval (e.g., 24 times per second). The merged image is then sent to the front-end client.

According to at least one aspect, the merge operation is performed on only a partial region (e.g., a partial spatial region) of an image, and not the entire image itself. As such, rendering results corresponding only to the partial region of the image are sent to the client at a particular time. According to at least one embodiment, results corresponding to multiple partial regions are sent to the client over multiple times (or steps). As such, results that cover (or span) a whole image are sequentially sent over multiple times (or steps). According to at least one embodiment, the size or quantity of data that is sent to the client at a particular time may be controlled by changing the size of a corresponding partial region.

Figure 2:
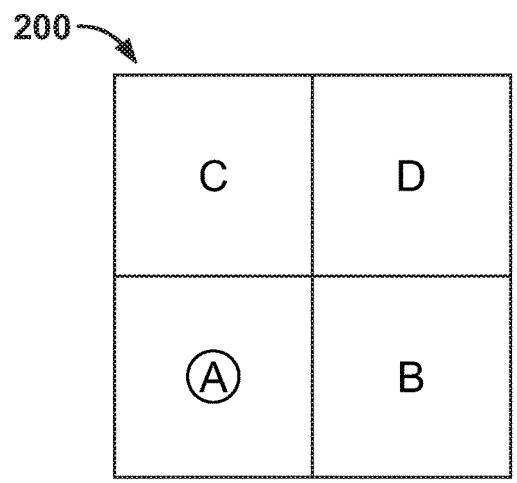
FIG. 2 is a block diagram illustrating selection of particular data for delivery to a front-end client according to at least one embodiment.

FIG. 2 is a block diagram illustrating selection of particular data for delivery to a front-end client according to at least one embodiment.

In the example of FIG. 2, an image 200 is divided into 4 non-overlapping regions (regions A, B, C and D). According to at least one embodiment, at a particular time, a merge process (e.g., merger 140) operates on only a selected partial region of the image 200. For example, the merge process operates on only one of the non-overlapping regions illustrated in FIG. 2. For example, at a particular time, the merge process operates on only rendering results (e.g., received from rendering engine 130-1, rendering engine 130-2 and/or rendering engine 130-3) corresponding to region A. At this time, merged results corresponding to region A are sent. In contrast, merged results corresponding to regions B, C and/or D are sent at one or more other times.

In particular situations (e.g., situations involving interactive lighting sessions), updates of an entire image (e.g., the entire image 200) are not necessarily required at every time (e.g., at every user-defined interval). For example, for typical purposes of an interactive lighting client, it may be sufficient to provide an update of the entire image over a reasonably brief period of time. According to one or more aspects of the present disclosure, visual updates are provided to the artist via a front-end client, while, e.g., staying within (or more closely adhering to) constraints associated with the bandwidth of a communication channel located between a merge process (e.g., merger 140) and the front-end client (e.g., front-end client 110).

According to a further aspect, the merge process records (or stores) the size of data (corresponding to a respective partial region) that is sent at each time within a particular period. The merge process may use such information to track changes in use of the communication channel over time and/or to improve usage of the communication channel at one or more upcoming times.

Figure 3A:
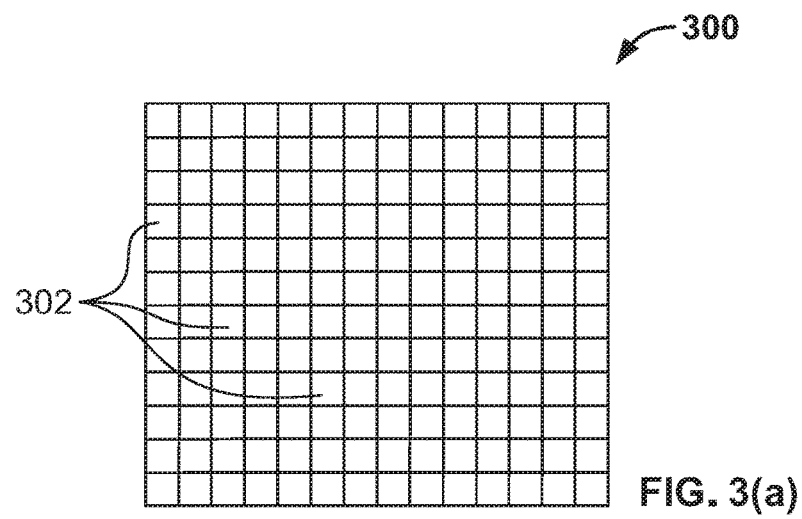
FIGS. 3(a) and 3(b) illustrate an example of selection of partial regions of an image according to at least one embodiment.
Figure 3B:
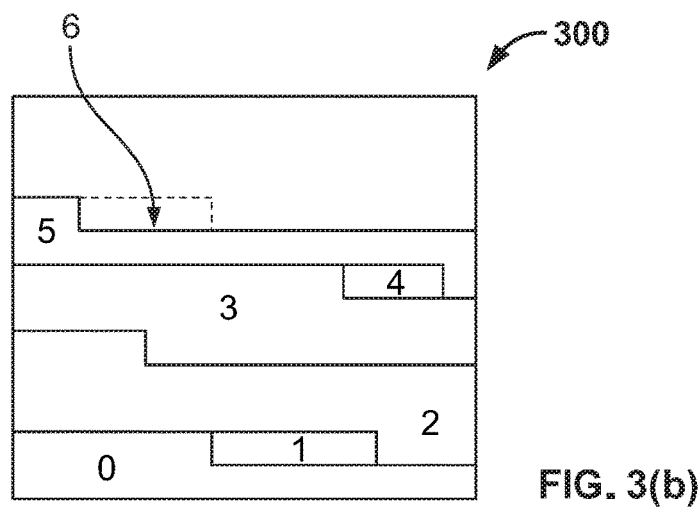
Figure 4:
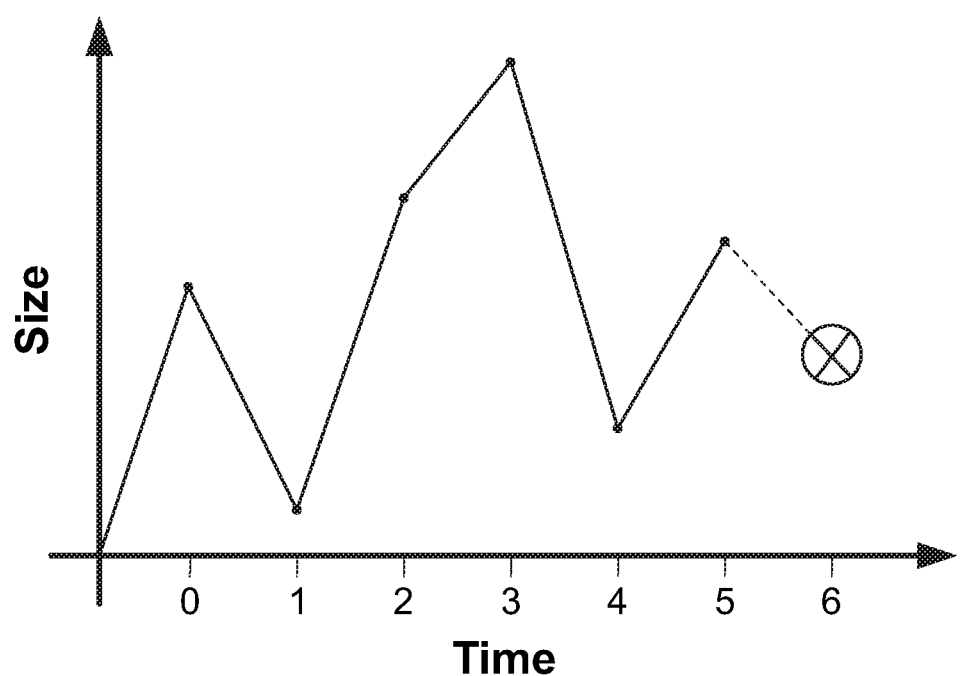
FIG. 4 is a graph illustrating example quantities of data delivered to the front-end client over time, according to the example of FIGS. 3(a) and 3(b).

The sending of data corresponding to partial regions of an image will now be described in more detail with reference to FIGS. 3(a) and 3(b). FIGS. 3(a) and 3(b) illustrate an example of selection of partial regions of an image according to at least one embodiment. The partial regions are selected to facilitate delivery of data to a front-end client over time. The corresponding use of the communication channel (e.g., between a merge process and the front-end client) will be described in more detail with reference to FIG. 4. FIG. 4 illustrates example quantities of data delivered to the front-end client over time, according to the example of FIGS. 3(a) and 3(b).

FIG. 3(a) illustrates an image 300 that is divided (or partitioned) into tiles 302. Each tile 302 is composed of m-by-n pixels of the image 300. According to at least one embodiment, m is equal to n, such that each tile 302 corresponds to a square region of pixels. For example, each tile 302 may be composed of 8-by-8 pixels.

FIG. 3(b) illustrates selection of partial regions of the image 300. Each region illustrated in FIG. 3(b) is composed of corresponding tiles 302 that are illustrated in FIG. 3(a). For example, FIG. 3(b) illustrates selection of a region 0. The region 0 is composed of corresponding tiles 302 that are illustrated in FIG. 3(a). FIG. 3(b) also illustrates selection of region 1, region 2, region 3, region 4, region 5 and region 6. Similar to the region 0, each of these additional regions is composed of corresponding tiles 302 that are illustrated in FIG. 3(a)

At a particular time (e.g., time t=0), data (e.g., results produced by rendering engines) corresponding to the tiles 302 that are located in the region 0 are merged and sent to the front-end client. As illustrated in the graph of FIG. 4, a corresponding quantity of data is sent to the client at time t=0.

In contrast, data corresponding to the tiles 302 that are not located in the region 0 are not merged (e.g., by the merger 140) and are not sent to the front-end client. Accordingly, a workload (e.g., of the merger 140) is reduced. Also, bandwidth usage (e.g., of a communication channel leading to the front-end client) is reduced. Regarding the regions for which data are neither merged nor sent (e.g., regions of the image 300 that are outside of the region 0), according to at least one embodiment, the merger 140 may receive the data from the rendering engines (e.g., rendering engines 130-1, 130-2 and 130-3). The received data may be stored, e.g., by updating a local database. However, the received data is not further processed.

Similarly, at a subsequent time (e.g., time t=1), data (e.g., merged rendering results) corresponding to the tiles 302 that are located in the region 1 is sent to the front-end client. As illustrated in FIG. 4, a corresponding quantity of data is sent to the client at time t=1. As shown in FIG. 3(b), region 1 is smaller than region 0. As such, relative to region 0, region 1 is composed of a fewer number of tiles. Therefore, FIG. 4 illustrates that the sample quantity of data that is sent to the front-end client at time t=1 is smaller than the quantity of data that was sent to the client at time t=0.

In contrast, data corresponding to the tiles 302 that are not located in the region 1 are not merged (e.g., by the merger 140) and are not sent to the front-end client. Accordingly, a workload (e.g., of the merger 140) is reduced. Also, bandwidth usage (e.g., of a communication channel leading to the front-end client) is reduced. Regarding the regions for which data are neither merged nor sent (e.g., regions of the image 300 that are outside of the region 1), according to at least one embodiment, the merger 140 may receive the data from the rendering engines (e.g., rendering engines 130-1, 130-2 and 130-3). The received data may be stored, e.g., by updating a local database. However, the received data is not further processed.

Similarly, at a subsequent time (e.g., time t=2), data (e.g., results produced by rendering engines) corresponding to the tiles 302 that are located in the region 2 are merged and sent to the front-end client. As illustrated in the graph of FIG. 4, a corresponding quantity of data is sent to the client at time t=2. As shown in FIG. 3(b), region 2 is larger than both region 0 and region 1. As such, relative to both region 0 and region 1, region 2 is composed of a larger number of tiles. Therefore, FIG. 4 illustrates that the sample quantity of data that is sent to the front-end client at time t=2 is larger than the respective quantities of data that were sent to the client at times t=0 and t=1.

In contrast, data corresponding to the tiles 302 that are not located in the region 2 are not merged (e.g., by the merger 140) and are not sent to the front-end client. Accordingly, a workload (e.g., of the merger 140) is reduced. Also, bandwidth usage (e.g., of a communication channel leading to the front-end client) is reduced. Regarding the regions for which data are neither merged nor sent (e.g., regions of the image 300 that are outside of the region 2), according to at least one embodiment, the merger 140 may receive the data from the rendering engines (e.g., rendering engines 130-1, 130-2 and 130-3). The received data may be stored, e.g., by updating a local database. However, the received data is not further processed.

Similarly, at subsequent times t=3, t=4, t=5, data (e.g., results produced by rendering engines) corresponding to the tiles 302 that are located in the regions 3, 4 and 5, respectively, are merged and sent to the front-end client. According to at least one embodiment, a next partial region (e.g., region 6) is selected based on past information regarding partial region data size and transmission times. According to at least one particular embodiment, the size of region 6 may be selected so as to better utilize the communication channel (e.g., between a merge process and the front-end client). For example, the size of region 6 is selected so as to utilize the communication channel without exceeding the (then-existing) entire bandwidth (or a user-defined bandwidth) of the communication channel. In this regard, an estimate of the bandwidth may be determined based on past information regarding partial region data size and transmission time. Based on this estimate, the size of region 6 is selected in order to result in a best (or more optimal) quantity of data that is to be transmitted at time t=6.

For example, with reference to FIG. 3(b), data corresponding to the tiles 302 that are located in region 6 are to be sent at time t=6. The size of region 6 may be selected so as to fully utilize the (then-existing) entire bandwidth (or a user-defined bandwidth) of the communication channel. Here, an estimate of the bandwidth may be determined based on the past information corresponding to times t=0, 1, 2, 3, 4, 5 (see, e.g., the corresponding quantities of data that are illustrated in FIG. 4). The size of region 6 is selected in order to result in a best (or more optimal) quantity of data, as illustrated in FIG. 4. In at least one aspect, the size of region 6 is selected so as to utilize the communication channel without exceeding the entire bandwidth that is available to or defined by the user.

As described earlier with reference to FIG. 1, results that are independently received from the rendering engines may be merged into a single image at a constant interval that is defined by a user (e.g., 24 times per second, or 24 frames per second). By controlling the sizes of partial regions according to embodiments of the present invention (see, e.g., the example illustrated in FIGS. 3(b) and 4), a communication bandwidth may be utilized without exceeding one or more associated limitations or constraints, in order to more stably converge on the user-defined update interval. As such, the likelihood that data transmissions will overwhelm the communication channel and/or the front-end client is reduced. Features described with reference to various embodiments can be applied, more generally, to tailor the use of a communication channel for any of various processes over any of various connections.

For example, particular features have been described with reference to communication between the merge process (e.g., merger 140) and the front-end client (e.g., front-end client 110). However, it is understood that such features may also be applied to communication between the rendering engines (e.g., rendering engines 130) and the merge process (e.g., merger 140). For example, features that have been described with reference to partial regions (see FIGS. 2, 3(a), 3(b) and 4) may be applied to control the quantities of data that are communicated from the rendering engines to the merge process.

In various embodiments, the render process sends data packets to the merge process using the partial region organization that has been described. From the perspective of the client, rendering of the image occurs independent of any sending region. For example, a data packet is still sent from the render process at every user-defined interval. Over multiple sending iterations, an entire render result is eventually sent to the merge process. Render operations and send operations are executed independently and in parallel inside the render engine process (as a separate thread). Adjustments of the sending region and timing need not impact the rendering main logic. As such, render performance may be kept at (or near) maximal levels.

The rendering results described earlier, e.g., with reference to FIG. 1, may be information regarding a particular Arbitrary Output Value (AOV) layer (or AOV channel). According to at least one embodiment, information regarding a single rendered image includes several AOV layers (e.g., tens of AOV layers). Generally speaking, images produced by cameras (e.g., a digital camera) may include only such a single AOV layer (e.g., color information).

Unlike such devices, renderers such as rendering engines 130 produce, for each pixel, various detail information for other AOV layers. For example, the rendering engines 130 may produce information other than (or in addition to color information), and the information that is to be saved as part of image data may be specified by a user. Such information can be classified as AOV layers or channels. By way of example, apart from color information, different AOV layers may include information pertaining to alpha, object ID, surface normal, illumination coming from diffuse lighting, illumination coming from transparency, illumination coming from reflection, illumination coming from a particular light, UV tangents, world space position of the surface point, etc.

Due to constraints of current-day monitor technology, during an interactive rendering session, an artist is able to view only a single AOV layer at a given time. However, it is appreciated that, if technological advances allow multiple AOV layers to be displayed concurrently, then features that are described herein with reference to various embodiments may also apply to such situations.

According to one or more aspects, the specific AOV layer that is being viewed by the artist is prioritized with respect to consumption of communication-channel bandwidth, e.g., between the merge process and the front-end client. For example, identification of the AOV layer that is being viewed by the artist may be provided to the rendering engines and the merge process. Accordingly, when the artist updates the AOV layer being viewed at the front-end client, then the updated AOV layer may be assigned a higher level of priority with respect to consumption of bandwidth by the rendering engines and the merge process. Even though the artist may ultimately prefer that all AOV layers be returned to the front-end client, prioritizing the return of only a specific AOV layer may be acceptable at a specific time because the artist is typically making decisions (e.g., regarding lighting changes) based on the specific AOV layer that is being viewed at that time. Therefore, if eventual consistency is acceptable to the artist, then prioritizing the AOV layer that the artist is viewing (e.g., at earlier stages) is feasible.

Prioritizing the AOV layer being viewed may be feasible for additional reasons. These additional reasons are related to the nature of the artist workflow and/or characteristics of current ray-trace renders.

First, the workflow is centered around an artist making changes to a scene and then evaluating the results of those changes based on the effect(s) that the changes have on the rendered image. Large (or more substantial) changes may be made early on as an artist begins work on a scene. For example, the artist may make such changes relatively frequently. Each of these changes corresponds to a respective new syncId value. During this early stage, the artist may be interested only in the AOV layers being viewed and may not necessarily be interested in viewing results for all AOV layers.

As a result, when a new syncId is received, the rendering engines may quickly spread single samples over many pixels of the image in an effort to more quickly return an overall impression of how the scene appears based on the new artist-driven changes. Accordingly, large sections of the image may be changing quickly, and the communication channel may be strained. In progressive rendering, the interactive rendering process then iterates over the image again, progressively sending more samples into pixels with each iteration, until an iteration is reached in which artist-defined stopping conditions are met.

Second, as the artist refines the changes (e.g., lighting and scene changes) and the rendered scene approaches a final desired appearance, the rate at which the artist initiates changes to the scene may slow. Here, the artist may be more patient in waiting for the rendering engines to send more samples to pixels and therefore refine the quality of the image, before further changes are made.

As a result, the rendering engines may be spending more time refining fewer pixels with each iteration that the artist waits for increased sampling (e.g., due to the progressive rendering). Consequently, fewer pixels will change, thereby decreasing the quantity of data produced by changes to the AOV layer being viewed at each update cycle. The reduction in the consumption of bandwidth by that specific AOV layer leaves more bandwidth for the transmission of the non-viewed AOV data (e.g., queued non-viewed AOV data) that could not be sent earlier.

According to at least one embodiment, an AOV layer being viewed is given priority over AOV layers that are not being viewed. Data of AOV layers that are not being viewed may be sent after data of an AOV layer that is being viewed has already been sent.

For example, an image being rendered may include 20 AOV layers. Here, the image includes an 8×8 tile (64 pixels) that may be approximately 15 Kb in size if it mainly includes triplets of single-precision float data. Upon sending packets for such an image, it may be determined that, at the 24 fps rate, only about 2 Kb of data can be sent at each interval. If the artist is viewing an AOV layer that amounts to only 1.5 Kb of data at each interval (or cycle), then all of the data for the AOV layer being viewed may be sent. The remaining bandwidth of 0.5 Kb may be occupied by one or more AOV layers not being viewed. In this situation, the artist sees more rapid, low-latency updates for the AOV layer being viewed, while data for non-viewed AOV layers are provided to the front-end client at a higher latency. During a particular send cycle, any portions of AOV data that are not sent may be queued and saved for transmission during a subsequent cycle. According to at least one embodiment, once a new syncId is detected, queued results may be flushed because the detection of the new syncId indicates that the artist has changed the scene (again) and has requested a new render based on modified scene settings.

Although it is understood that specifically shaping the size of packets is possible, for purposes of expediency and/or reduced computation loads, according to at least one embodiment, the transmission intervals for specific AOV packets are adjusted.

For example, each AOV layer may have its own independent interval with respect to the sending of updates. An AOV layer that is currently being viewed by an artist may be set at a high (or relatively high) frequency. As such, updates regarding this AOV layer will be periodically provided at correspondingly short (or relatively short) intervals or time spans. Therefore, this AOV layer will update at a high rate. In comparison, AOV layers that are not being viewed may be set to a low (or relatively low) frequency. As such, updates regarding such AOV layers will be periodically provided at correspondingly long (or relatively long) intervals. Therefore, such AOV layers will update at a low rate. If a particular AOV layer is set to a sufficiently low frequency (i.e., a sufficiently long interval), then updates regarding this AOV layer may effectively be stopped (or preempted). Once the rendering of an image is completed, then updates regarding all AOV layers may be sent regardless of their set intervals or frequencies.

It is appreciated that particular AOV layers that are not being viewed may create a data backlog that may be substantial. According to at least one embodiment, if the artist is comparing 2 or more layers and switching back-and-forth between these layers relatively frequently, then the 2 or more layers can be set at a similarly high rate of update. Here, the region of the image that is updated may be reduced in size (e.g., to offset an increase in bandwidth consumption that is caused by reporting 2 or more layers). According to at least one further embodiment, controls (e.g., controls that may be set by an artist) are provided, to reduce or increase an AOV data size output rate.

Aspects directed to a system for multi-machine rendering have been described. According to various embodiments, a more safe and stable transmission of data can be facilitated. For example, the data transmission can adhere more closely (e.g., limit itself) to a user-defined bandwidth, while still attempting to maximize (or at least increase) network resource efficiency. According to various embodiments, a shorter latency can be achieved for interactive lighting sessions, thereby providing a better near-real-time experience for the artist at the front-end client.

For purposes of description, various aspects have been described with reference to a single merge process (e.g., merger 140), which may be sufficient for up to 400 (or more) multi-core render processes. However, it is understood that features described are extendable to multiple merge processes which could all communicate to the front-end client, or multiple merge processes that are arranged in a hierarchy in which multiple merge processes feed a single merge process that then communicates to the front-end client. For example, merge processes may be arranged in a hierarchy if or when the load on a single merge process would exceed the capabilities of the network or computational or other resources of a single computer.

In environments other than interactive lighting sessions (e.g., video conferencing or video playback), whole image data (e.g., data for an entire image) may need to be sent at every cycle. In such environments, lossy data compression may be used to reduce bandwidth consumption (e.g., in order to fit within a target bandwidth). However, such solutions may result in reduced image quality. For environments including interactive lighting sessions, using lossy data compression may not be acceptable, e.g., when sending data in its original (e.g., uncompressed) data precision is preferred or desired.

According to various disclosed embodiments, a more safe and robust lossless data transfer may be achieved using an autonomous bandwidth adjustment. Also, a high-quality and robust framework for multi-machine interactive rendering applications may be provided. As such, allocated network resources may be consumed in a manner that provides a best possible session environment to the user.

Figure 5:
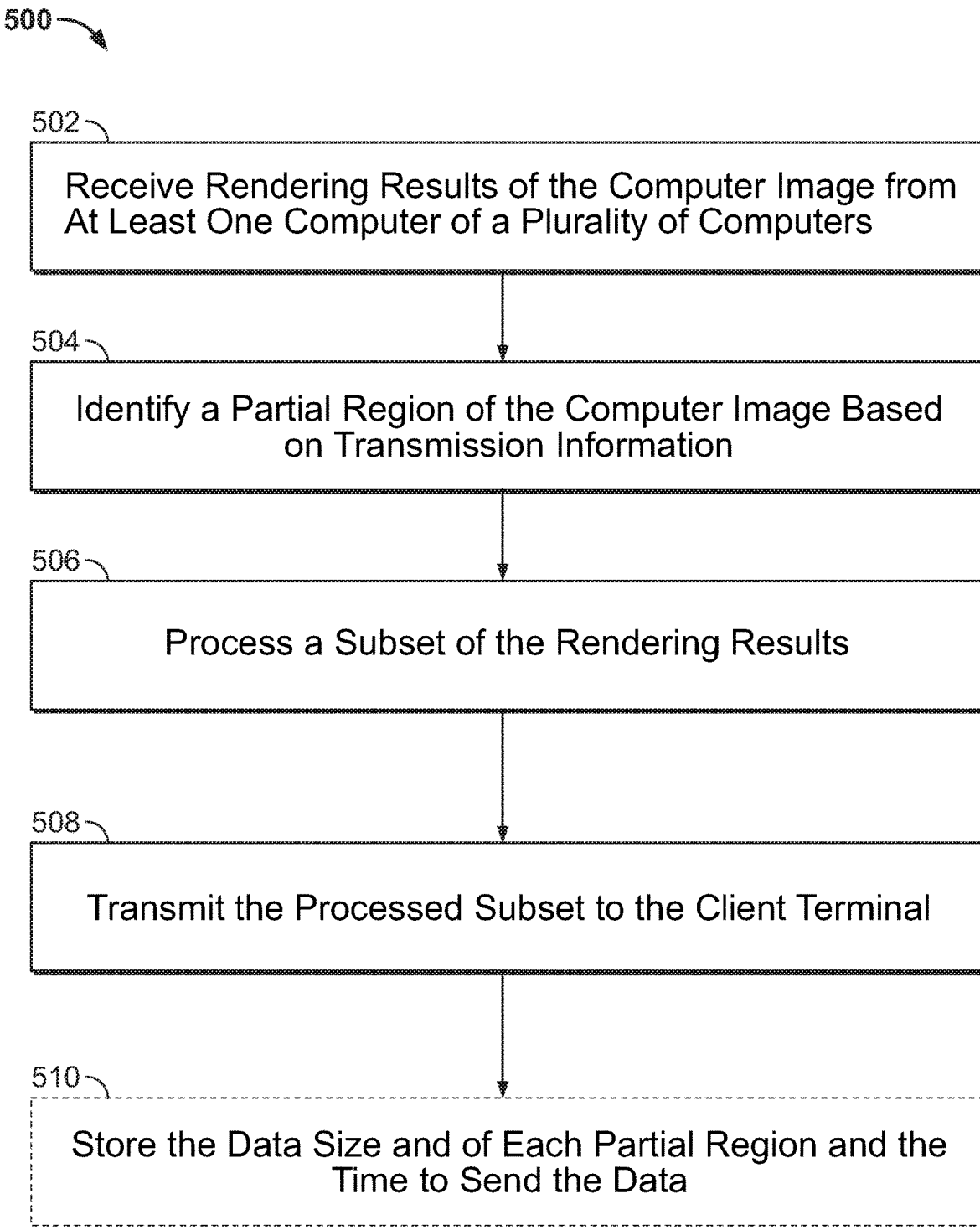
FIG. 5 illustrates a flowchart of a method of transmitting rendering data of a computer image to a client terminal via a communication channel according to at least one embodiment.

FIG. 5 illustrates a flowchart of a method 500 of transmitting rendering data of a computer image to a client terminal via a communication channel according to at least one embodiment.

At block 502, rendering results of the computer image are received from at least one computer of a plurality of computers. For example, with reference back to FIG. 1, rendering results of the computer image are received from at least one rendering engine 130.

At block 504, a partial region of the computer image is identified based on transmission information. For example, with reference back to FIG. 3(b), region 6 of the image 300 is identified based on transmission information.

According to at least one further embodiment, the transmission information includes information regarding data size of one or more prior transmissions to the client terminal via the communication channel. Identifying the partial region includes identifying the partial region based on the information regarding the data size of the one or more prior transmissions.

For example, with reference to FIGS. 3(b) and 4, the transmission information includes information regarding data size of one or more prior transmissions at times t=0, 1, 2, 3, 4 and/or 5. Identifying the region 6 includes identifying the region 6 based on the information regarding the data size of the one or more prior transmissions.

According to at least one further embodiment, the identified partial region includes at least one tile of the computer image. For example, with reference to FIGS. 3(a) and 3(b), the identified region 6 includes at least one tile 302 of the image 300 that is located in the identified region 6.

According to at least one further embodiment, identifying the partial region of the computer image is further based on a user request to adjust a data size of an upcoming transmission to the client terminal. For example, the partial region may be identified further based on a request by an artist to adjust an output rate of an AOV layer being viewed.

At block 506, a subset of the rendering results is processed, where the subset corresponds to the identified partial region of the computer image. For example, with reference to FIGS. 1 and 3(b), a subset of the rendering results is processed at merger 140. The subset corresponds to the identified region 6 of the image 300.

According to at least one further embodiment, processing the subset of the rendering results includes merging the subset of the rendering results. For example, with reference to FIG. 1, processing the subset of the rendering results includes merging, at the merger 140, the subset of the rendered results received from at least one rendering engine 130.

According to at least one further embodiment, receiving the rendering results includes receiving first rendering results and second rendering results, the first rendering results being for a first AOV layer and the second rendering results being for a second AOV layer. Based on display of the first AOV layer at the client terminal, processing the subset of the rendering results includes prioritizing the first rendering results over the second rendering results.

For example, with reference to FIG. 1, rendering results for a first AOV layer (e.g., color information) and rendering results for a second AOV layer (e.g., illumination coming from reflection) are received at the merger 140. Based on the color information being displayed at the front-end client 110, processing the subset of the rendering results includes prioritizing the rendering results for the color information over the rendering results for the illumination coming from reflection.

At block 508, the processed subset of the rendering results is transmitted at a particular time to the client terminal via the communication channel. For example, with reference to FIGS. 1, 3(b) and 4, the processed subset corresponding to the region 6 is transmitted at the time t=6 to the front-end client 110 via a communication channel between the merger 140 and the front-end client 110.

According to at least one further embodiment, rendering results other than the subset of the rendering results are not transmitted at the particular time. For example, with reference to FIGS. 3(b) and 4, rendering results other than the subset of the rendering results corresponding to region 6 are not transmitted at the particular time.

According to at least one further embodiment, receiving the rendering results (see, e.g., block 502) includes receiving rendering results corresponding to a particular change request from a user. The processed subset of the rendering results is transmitted to the client terminal in response to receiving the rendering results corresponding to the particular change request. For example, with reference to FIG. 1, the received rendering results may correspond to a lighting change request initiated by an artist at the front-end client 110. The processed subset of these rendering results is transmitted to the front-end client 110 in response to receiving the rendering results corresponding to the lighting change request.

According to at least one further embodiment, processing the subset of the rendering results includes processing a subset of the first rendering results and processing a subset of the second rendering results, the subset of the first rendering results and the subset of the second rendering results both corresponding to the identified partial region of the computer image. Based on display of the first AOV layer at the client terminal, transmitting the processed subset of the rendering results to the client terminal includes transmitting the subset of the first rendering results according to a first frequency and transmitting the subset of the second rendering results according to a second frequency that is lesser than the first frequency.

For example, processing the subset of the rendering results includes processing a subset of the rendering results for the color information and processing a subset of the rendering results for the illumination coming from reflection, where both subsets correspond to the identified region 6 of the image 300. Based on display of the color information at the front-end client 110, transmitting the processed subset of the rendering results to the client includes transmitting the subset of the rendering results for the color information according to a first frequency and transmitting the subset of the subset of the rendering results for the illumination coming from reflection according to a second frequency that is lesser than the first frequency.

According to at least one further embodiment, at block 510, a data size of the processed subset of the rendering results and the particular time at which the processed subset of the rendering results is transmitted are stored.

For example, with reference to FIGS. 3(*b*) and 4, a data size of the processed subset of rendering results corresponding to region 6 and the time t=6 at which the processed subset is transmitted are stored.

Figure 6:
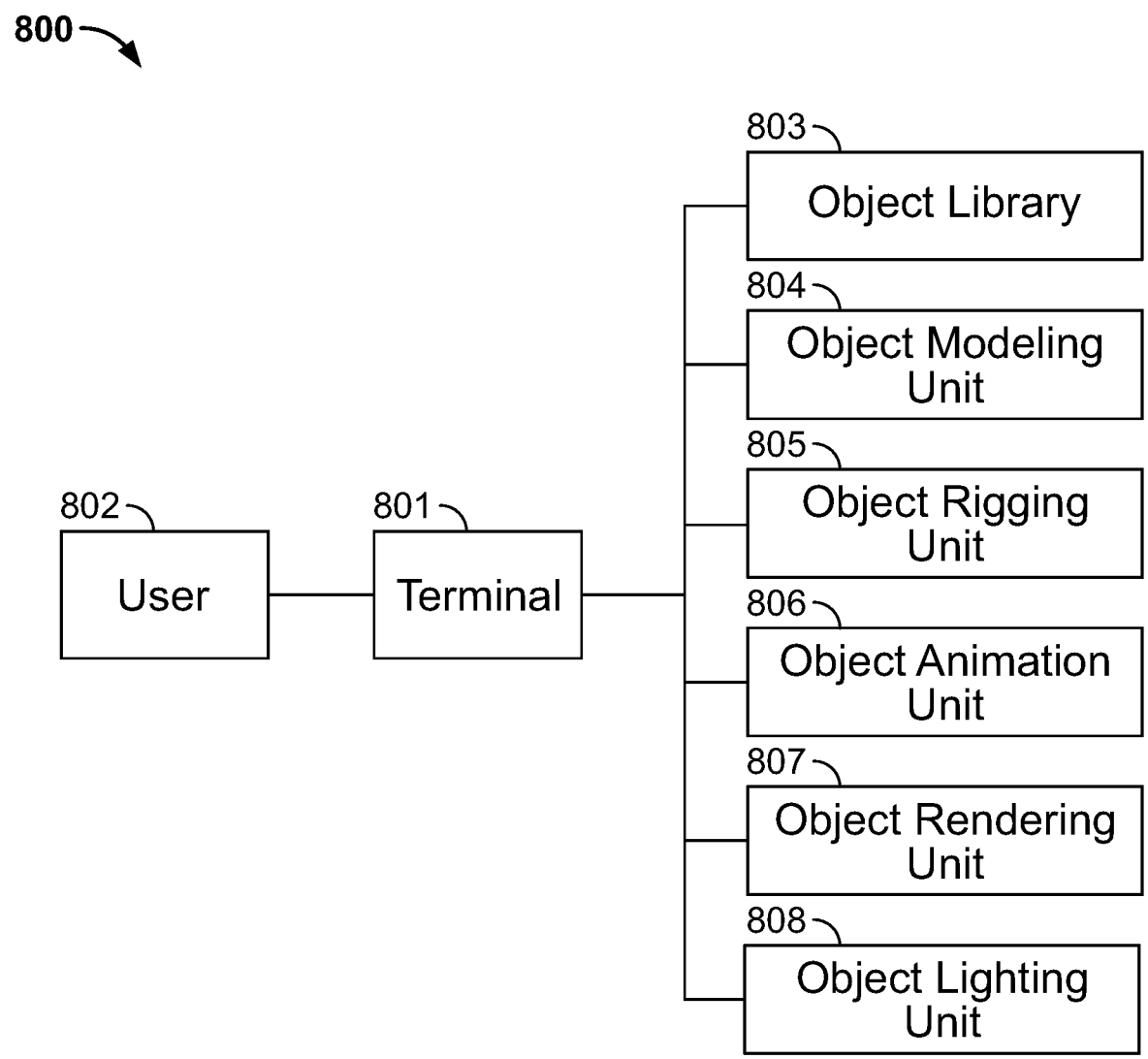
FIG. 6 is an illustration of a computing environment according to at least one embodiment.

Referring now to FIG. 6, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 801 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 7:
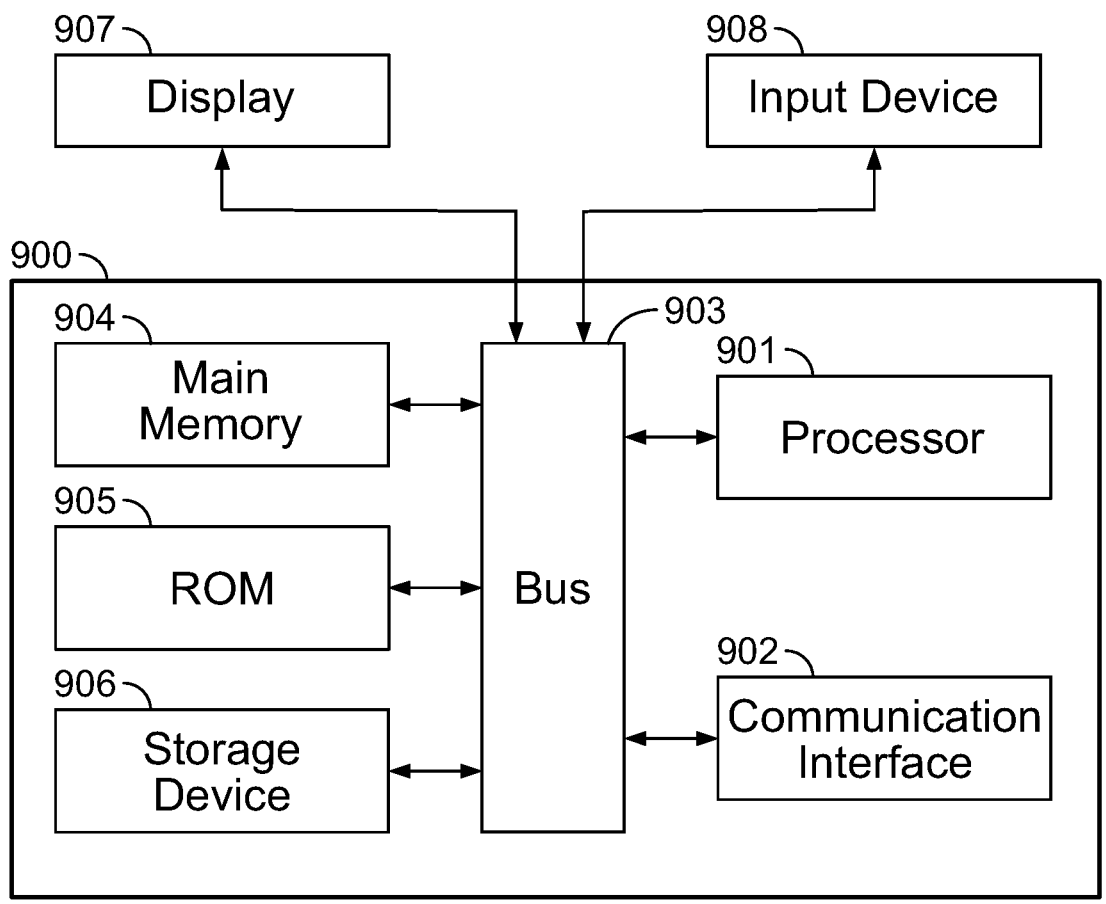
FIG. 7 is a block diagram of a device according to at least one embodiment.

Referring to FIG. 7, an illustration of an example computer 900 is provided. One or more of aspects of the system 800 discussed above in FIG. 6, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of transmitting rendering data of a computer image to a client terminal via a communication channel, the method comprising:
    receiving rendering results of the computer image from at least one computer of a plurality of computers;
    identifying a partial region of the computer image based on transmission information;
    processing a subset of the rendering results, the subset corresponding to the identified partial region of the computer image; and
    transmitting, at a particular time, the processed subset of the rendering results to the client terminal via the communication channel,
    wherein the transmission information comprises information regarding data size of one or more prior transmissions to the client terminal via the communication channel, and
    wherein identifying the partial region comprises identifying the partial region based on the information regarding the data size of the one or more prior transmissions.

2. The method of claim 1, wherein the identified partial region comprises at least one tile of the computer image.

3. The method of claim 1, wherein identifying the partial region of the computer image is further based on a user request to adjust a data size of an upcoming transmission to the client terminal.

4. The method of claim 1, wherein processing the subset of the rendering results comprises merging the subset of the rendering results.

5. The method of claim 1, wherein rendering results other than the subset of the rendering results are not processed, and are not transmitted at the particular time.

6. The method of claim 1, wherein:
    receiving the rendering results comprises receiving rendering results corresponding to a particular change request from a user; and
    the processed subset of the rendering results is transmitted to the client terminal in response to receiving the rendering results corresponding to the particular change request.

7. The method of claim 1, wherein:
    receiving the rendering results comprises receiving first rendering results and second rendering results, the first rendering results being for a first arbitrary output value (AOV) layer and the second rendering results being for a second AOV layer; and
    based on display of the first AOV layer at the client terminal, processing the subset of the rendering results comprises prioritizing the first rendering results over the second rendering results.

8. The method of claim 7, wherein:
    processing the subset of the rendering results comprises processing a subset of the first rendering results and processing a subset of the second rendering results, the subset of the first rendering results and the subset of the second rendering results both corresponding to the identified partial region of the computer image; and
    based on display of the first AOV layer at the client terminal, transmitting the processed subset of the rendering results to the client terminal comprises transmitting the subset of the first rendering results according to a first frequency and transmitting the subset of the second rendering results according to a second frequency that is lesser than the first frequency.

9. The method of claim 1, further comprising:
    storing a data size of the processed subset of the rendering results and the particular time at which the processed subset of the rendering results is transmitted.

10. A machine-readable non-transitory medium having stored thereon machine-executable instructions for transmitting rendering data of a computer image to a client terminal via a communication channel, the instructions comprising:
    receiving rendering results of the computer image from at least one computer of a plurality of computers;
    identifying a partial region of the computer image based on transmission information;
    processing a subset of the rendering results, the subset corresponding to the identified partial region of the computer image; and
    transmitting, at a particular time, the processed subset of the rendering results to the client terminal via the communication channel,
    wherein the transmission information comprises information regarding data size of one or more prior transmissions to the client terminal via the communication channel; and
    wherein identifying the partial region comprises identifying the partial region based on the information regarding the data size of the one or more prior transmissions.

11. The machine-readable non-transitory medium of claim 10, wherein the identified partial region comprises at least one tile of the computer image.

12. The machine-readable non-transitory medium of claim 10, wherein identifying the partial region of the computer image is further based on a user request to adjust a data size of an upcoming transmission to the client terminal.

13. The machine-readable non-transitory medium of claim 10, wherein processing the subset of the rendering results comprises merging the subset of the rendering results.

14. The machine-readable non-transitory medium of claim 10, wherein rendering results other than the subset of the rendering results are not processed, and are not transmitted at the particular time.

15. The machine-readable non-transitory medium of claim 10, wherein:

receiving the rendering results comprises receiving rendering results corresponding to a particular change request from a user; and the processed subset of the rendering results is transmitted to the client terminal in response to receiving the rendering results corresponding to the particular change request.

16. The machine-readable non-transitory medium of claim 10, wherein:

receiving the rendering results comprises receiving first rendering results and second rendering results, the first rendering results being for a first arbitrary output value (AOV) layer and the second rendering results being for a second AOV layer; and based on display of the first AOV layer at the client terminal, processing the subset of the rendering results comprises prioritizing the first rendering results over the second rendering results.

17. The machine-readable non-transitory medium of claim 16, wherein:

processing the subset of the rendering results comprises processing a subset of the first rendering results and processing a subset of the second rendering results, the subset of the first rendering results and the subset of the second rendering results both corresponding to the identified partial region of the computer image; and based on display of the first AOV layer at the client terminal, transmitting the processed subset of the rendering results to the client terminal comprises transmitting the subset of the first rendering results according to a first frequency and transmitting the subset of the second rendering results according to a second frequency that is lesser than the first frequency.

18. A system for transmitting rendering data of a computer image to a client terminal via a communication channel, the system comprising one or more controllers configured to:

receive rendering results of the computer image from at least one computer of a plurality of computers;

identify a partial region of the computer image based on transmission information;

process a subset of the rendering results, the subset corresponding to the identified partial region of the computer image; and provide, at a particular time, the processed subset of the rendering results for transmission to the client terminal via the communication channel, wherein the transmission information comprises information regarding data size of one or more prior transmissions to the client terminal via the communication channel; and wherein the one or more controllers are further configured to identify the partial region by identifying the partial region based on the information regarding the data size of the one or more prior transmissions.

19. A method of transmitting rendering data of a computer image to a client terminal via a communication channel, the method comprising:

receiving rendering results of the computer image from at least one computer of a plurality of computers;

identifying a partial region of the computer image based on transmission information;

processing a subset of the rendering results, the subset corresponding to the identified partial region of the computer image; and transmitting, at a particular time, the processed subset of the rendering results to the client terminal via the communication channel, wherein receiving the rendering results comprises receiving first rendering results and second rendering results, the first rendering results being for a first arbitrary output value (AOV) layer and the second rendering results being for a second AOV layer, wherein based on display of the first AOV layer at the client terminal, processing the subset of the rendering results comprises prioritizing the first rendering results over the second rendering results, wherein processing the subset of the rendering results comprises processing a subset of the first rendering results and processing a subset of the second rendering results, the subset of the first rendering results and the subset of the second rendering results both corresponding to the identified partial region of the computer image, and wherein based on display of the first AOV layer at the client terminal, transmitting the processed subset of the rendering results to the client terminal comprises transmitting the subset of the first rendering results according to a first frequency and transmitting the subset of the second rendering results according to a second frequency that is lesser than the first frequency.

20. A machine-readable non-transitory medium having stored thereon machine-executable instructions for transmitting rendering data of a computer image to a client terminal via a communication channel, the instructions comprising:

receiving rendering results of the computer image from at least one computer of a plurality of computers;

identifying a partial region of the computer image based on transmission information;

processing a subset of the rendering results, the subset corresponding to the identified partial region of the computer image; and transmitting, at a particular time, the processed subset of the rendering results to the client terminal via the communication channel, wherein receiving the rendering results comprises receiving first rendering results and second rendering results, the first rendering results being for a first arbitrary output value (AOV) layer and the second rendering results being for a second AOV layer, wherein based on display of the first AOV layer at the client terminal, processing the subset of the rendering results comprises prioritizing the first rendering results over the second rendering results, wherein processing the subset of the rendering results comprises processing a subset of the first rendering results and processing a subset of the second rendering results, the subset of the first rendering results and the subset of the second rendering results both corresponding to the identified partial region of the computer image, and wherein based on display of the first AOV layer at the client terminal, transmitting the processed subset of the rendering results to the client terminal comprises transmitting the subset of the first rendering results according to a first frequency and transmitting the subset of the second rendering results according to a second frequency that is lesser than the first frequency.

* * * * *